United States Patent [19]

Nudo et al.

[11] 4,206,942
[45] Jun. 10, 1980

[54] CARGO-PROTECTING DRAG-REDUCING ADJUSTABLE WIND-DEFLECTOR FOR VEHICLES

[76] Inventors: Alexander S. Nudo, both of 2508 S. Grand Ave. E., Springfield, Ill. 62707; Thomas Nudo, both of Springfield, Ill.

[21] Appl. No.: 879,585
[22] Filed: Feb. 21, 1978
[51] Int. Cl.$^2$ .............................................. B62D 37/02
[52] U.S. Cl. .................................... 296/1 S; 180/313; 105/2 R
[58] Field of Search ............... 296/1 S, 91; 180/1 FV; 105/2 R, 2 A

[56] References Cited

U.S. PATENT DOCUMENTS

| | | | |
|---|---|---|---|
| 3,137,511 | 6/1964 | Weil | 296/20 |
| 3,596,974 | 8/1971 | Adams | 296/91 |
| 3,794,372 | 2/1974 | Webb | 296/1 S |
| 3,929,369 | 12/1975 | Blair | 296/1 S |
| 4,026,595 | 5/1977 | Jacks | 296/1 S |

FOREIGN PATENT DOCUMENTS 905456  7/1972  Canada ...................................... 296/1 S

*Primary Examiner*—Philip Goodman
*Attorney, Agent, or Firm*—Ralph F. Staubly

[57] ABSTRACT

A light-weight cargo-protecting and air-flow-drag-reducing wind-deflector is made quickly and easily attachable to the roofs of automobiles or truck cabs by suction cups and conventional gutter-anchorable straps. The wind-deflector is formed of a curved fiber-reinforced plastic sheet and is made adjustable about a transverse horizontal axis close to the vehicle roof at a fore-aft location selected for optimal effectiveness. The slip-stream-modifying angle adjustability is provided simply by a pair of arms medially divided and slightly overlapped, which arms laterally connect the rear portions of a rectangular base frame to the upper side portions of the plastic sheet. The arms are made effectively length-adjustable by changing the angle defined at the interconnections between their divided sections. The overlapped mating faces of the divided arms are preferably radially die-grooved about bearing apertures which co-axially receive the ends of a single axle-rod. A rigid tube surrounds the axle-rod and co-operates with a lock nut on one end of the axle-rod and a wing nut on the other end to clamp the divided arms in their selected die-groove-fixed positions. The wind-deflector is flatwise collapsible for carrying, for storage, or for minimizing air-flow drag during non-use roof-attachment.

9 Claims, 3 Drawing Figures

U.S. Patent     Jun. 10, 1980     4,206,942
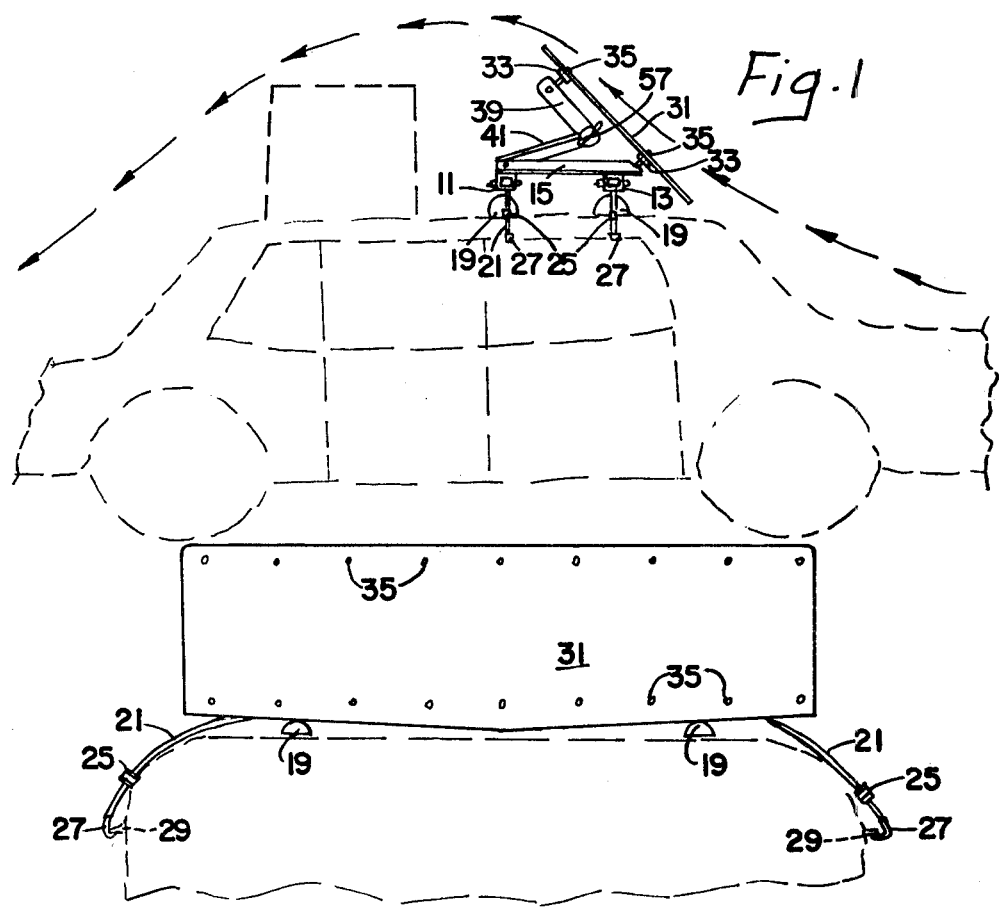
Fig. 1
Fig. 2
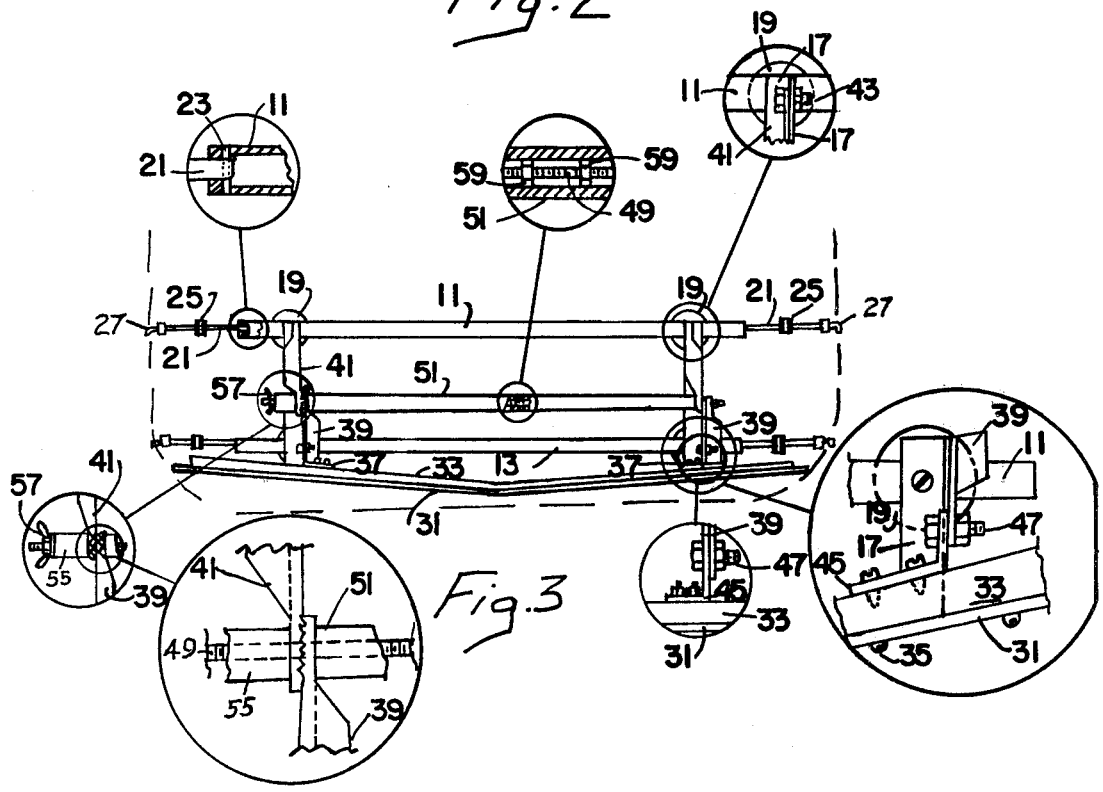
Fig. 3

CARGO-PROTECTING DRAG-REDUCING ADJUSTABLE WIND-DEFLECTOR FOR VEHICLES

BACKGROUND AND OBJECTS OF THE INVENTION

While the prior art discloses easily attachable and adjustable wind-deflectors for vehicle roofs (e.g. Adams U.S. Pat. No. 3,596,947) none is known which is made very easily adjustable by mechanism which also facilitates collapsing for compact storage or provides an external carrying handle for the collapsed device. It is accordingly the principal object of this invention to provide a wind-deflector having such mechanism. Other objects and advantages will become apparent as the following detailed description proceeds.

BRIEF DESCRIPTION OF THE DRAWINGS

FIG. 1 is a side elevational view of a preferred embodiment of the invention.

FIG. 2 is a front elevational view of the wind-deflector of FIG. 1.

FIG. 3 is a detailed plan view of the device of FIGS. 1 and 2.

SPECIFICATION

With reference now to the drawings, the numerals 11 and 13 designate a pair of parallel hollow extruded-metal bars, and numerals 15 and 17 indicate a pair of parallel angle-bars, which bars 11-17 are preferably formed for aluminum alloys and can be bolted, riveted or welded together to form a rigid rectangular base frame. As shown, they are bolted together by bolts which also attach conventional suction cups 19 to the frame corners. Straps 21 are provided for attaching the device at various positions on a vehicle roof depending upon the modification of the air slip-stream needed to decrease drag and/or to protect articles carried on the vehicle roof, or in a trailer, or in an open-bin truck body, from damage by air-borne matter or from blow-away loss. The straps 21 are attached to the ends of the bars 15 and 17 by being looped over pins 23 (upper left of FIG. 3). The straps 21 are made length-adjustable by conventional buckles 25 and have rubber-covered hooks 27 of known construction for engaging under the usual gutter members 29 (FIG. 2) on vehicle roofs.

A wind-deflector member is formed of a sheet 31 of fiber-re-inforced plastic (but could be metallic) and is desirably somewhat curved as shown in FIG. 3. The sheet 31 is provided with a pair of re-inforcing rectangular rods 33 fixed thereto as by screws 35. The lower rod 33 is pivotally connected adjacent its ends by a pair of bracket straps 37 (FIG. 3) to the front ends of the upstanding webs of the angle bars 15 and 17.

The mechanism for angular adjustment of the wind-deflector lamina comprises a pair of medially divided arms, each formed by a pair of angle-bars 39 and 41. The lower ends of the vertical webs of the angle-bars 41 are pivotally connected to the rear ends of the upstanding webs of the base-frame angle-bars 15 and 17 by bolts 43 (FIG. 3). The upper ends of the vertical webs of the angle bars 39 are pivotally connected to strap brackets 45 (FIG. 3) by bolts 47. The strap brackets 45 are fixed to the upper re-inforcing bar 33 on the wind-deflector lamina.

The divided-arm bars 39 and 41 have extended vertical flanges for overlapping medially of the arms. The overlapped extensions are centrally apertured to receive therethrough the ends of a single pivot rod 49. The facing surfaces of the overlapped areas are desirably radially grooved so that when they are clamped together relative rotation of the bars 39 and 41 around the rod 49 will be prevented.

A long sleeve 51 surrounds the rod 49 and acts as part of the clamping mechanism completed by a nut 53, a short sleeve 55 and a wing nut 57. The pivot rod 49 may be centered in the long sleeve 51 by spaced nuts 59.

The divided arms 39-41 are of lengths that permit the wind-deflector to collapse with the arms and clamp means between the approximately parallel base frame and wind-deflector lamina, or with the arms and long sleeve constituting an exterior carrying handle lying in a plane intermediate the planes of the base frame and the wind deflector lamina in their approximately parallel positions.

The invention having been described, what is claimed as being patentable is:

1. A cargo-protecting and air-flow-drag-reducing wind-deflector for vehicles, comprising: a generally horizontally disposable base frame, means for attaching said base frame at laterally and fore-aft spaced portions thereof to the roof of a vehicle, a relatively rigid wind-deflector lamina attached to said base frame for swinging adjustment about a transverse horizontally disposed axis located relatively close to said vehicle roof, and at least two arms pivotally connecting upper rear portions of said wind-deflector lamina to said base frame, each of said arms being medially divided and having overlapped mating faces with aligned bearing apertures formed therein, single axle means passing through all of said bearing apertures, and co-operating means for simultaneously clamping from one vehicle side said mating faces together in arm-length-adjusting selected angular position of the divided portions of said arms.

2. A wind-deflector according to claim 1, said single axle means being a single rod passing through the paired bearing apertures of all of said divided arms, and at least one sleeve surrounding said axle rod and forming, at its ends, parts of said clamping means.

3. A wind-deflector according to claim 2, said clamping means also comprising at least one nut threaded onto at least one end of said axle rod.

4. A wind-deflector according to claim 3, said at least one nut being a wind nut.

5. A wind-deflector according to claim 2, said means for attaching said base frame being a plurality of suction cups for quick and easy attachment of said base frame at fore-aft selected positions.

6. A wind-deflector according to claim 2, said base frame, said arms and said wind-deflector lamina being dimensioned to be collapsible into close substantial parallelism either for compact storage with said axle rod therebetween, or for carrying with said rod and its covering sleeve forming an exterior handle lying close to a plane intermediate those defined by said base frame and said wind-deflector lamina when collapsed.

7. A wind-deflector according to claim 2, said axle rod having a plurality of spaced toroidal elements coaxially centering said axle rod in said sleeve.

8. A wind-deflector according to claim 2, said base frame being fabricated primarily from aluminum-alloy bars each having at least two strip-like elements integrally joined at right-angle.

9. A wind-deflector according to claim 1, said wind-deflector lamina being a one-piece fiber-reinforced plastic sheet.

* * * * *